United States Patent [19]

Watson, Jr. et al.

[11] 3,831,758
[45] Aug. 27, 1974

[54] WASTE TREATMENT SYSTEM
[75] Inventors: Robert F. Watson, Jr.; Carl Labovitz; Peter R. Mulik, all of Pittsburgh, Pa.
[73] Assignee: Westinghouse Electric Corporation, Pittsburgh, Pa.
[22] Filed: July 5, 1973
[21] Appl. No.: 376,849

Related U.S. Application Data
[63] Continuation-in-part of Ser. No. 129,686, March 31, 1971, abandoned, which is a continuation-in-part of Ser. No. 80,984, Oct. 15, 1970, abandoned.

[52] U.S. Cl. .................................. 210/199, 210/221
[51] Int. Cl. .......................... B03d 1/00, C02c 1/38
[58] Field of Search ....................... 209/168–170; 210/44, 199, 220, 221, 209, 206, 152, 320

[56] References Cited
UNITED STATES PATENTS

| | | | |
|---|---|---|---|
| 1,401,598 | 12/1921 | Gahl | 209/170 |
| 2,793,185 | 5/1957 | Albrektsson et al. | 210/44 |
| 2,920,763 | 1/1960 | Lind et al. | 210/44 X |
| 2,975,122 | 3/1961 | Laboon | 210/44 X |
| 3,032,199 | 5/1962 | Sumiya | 209/170 |
| 3,313,795 | 4/1967 | Rubin | 210/44 X |
| 3,418,236 | 12/1968 | Mail | 210/44 |
| 3,510,001 | 5/1970 | Baer et al. | 210/44 X |
| 3,617,539 | 11/1971 | Grutsch et al. | 210/221 X |
| 3,622,508 | 11/1971 | Komline | 210/44 X |

Primary Examiner—Thomas G. Wyse
Attorney, Agent, or Firm—J. R. Campbell

[57] ABSTRACT

The effluent from a surge-conditioning tank is conveyed through two or more flotation cells flow-coupled in series with stagnation regions therebetween.

10 Claims, 2 Drawing Figures

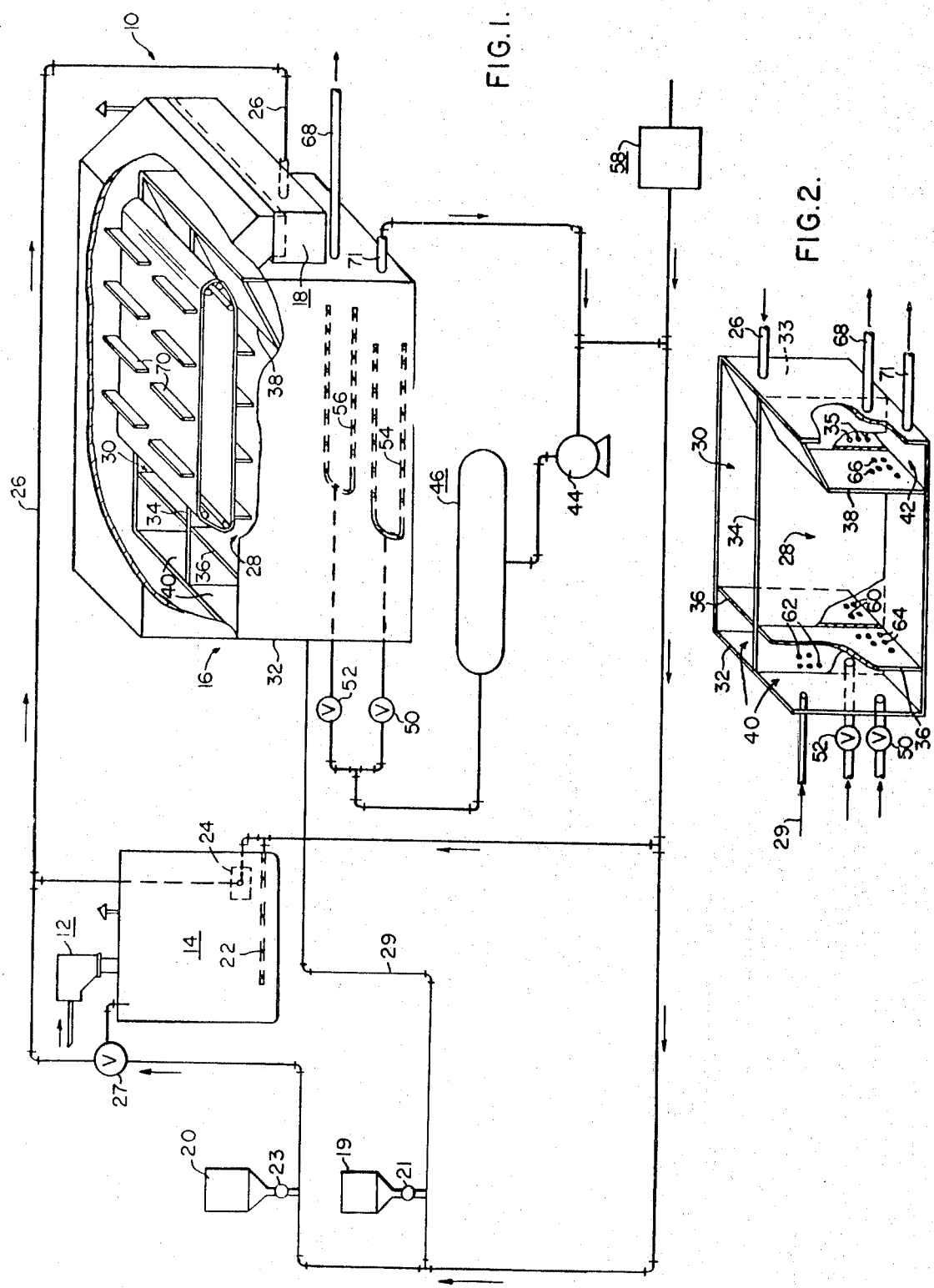

WASTE TREATMENT SYSTEM

CROSS-REFERENCE TO RELATED APPLICATIONS

This application is a continuation-in-part of application Ser. No. 129,686 filed Mar. 31, 1971 which is a continuation-in-part of application Ser. No. 80,984 filed Oct. 15, 1970, both now abandoned.

BACKGROUND OF THE INVENTION

This invention pertains to waste treatment systems and more particularly to such systems which rely upon flotation as their primary means for removing solids from the throughput stream. Previous waste disposal systems which relied upon flotation as a primary means for separating solid particles generally used one large flotation cell or several smaller cells connected in parallel. Increased capacity was then achieved by adding more parallel flotation systems or replacing existing systems with larger units.

SUMMARY OF THE INVENTION

Recent comparative testing has indicated that two or more flotation cells coupled in series are appreciably more effective than such cells flow-coupled in parallel, especially where the flow-coupling is through a stagnation region.

The system, in accordance with this invention, contemplates a sequence of operations including comminution, the addition of a chemical flocculating agent in a surge conditioning tank or in the input to the flotation cells and dissolved air flotation in a plurality of series coupled flotation cells with stagnation regions therebetween. Carbon filtration or other means may be utilized at the end of this throughput scheme where desirable.

The parallel flotation system found most desirable includes two flotation cells within a single tank which is baffled along its length so as to divide the tank into two separate flotation cells with two minute bubble producing manifolds in each of the cells. The end of the first cell and the beginning of the second cell may serve as a stagnation region by placing a perforated baffle across the ends of both cells.

A single air infusion pump and contacting vessel serves both cells with the output of the contacting vessel being divided between the bubble producing manifolds in each cell. Further, the input to the manifold of each cell may be adjusted by suitable valves so as to produce an optimum amount of bubbles in each cell. It is contemplated that the first of the series of cells will have a higher flow rate or recycle rate than the second or subsequent in the series of cells.

DESCRIPTION OF THE DRAWINGS

For a better understanding of the invention, reference may be had to the accompanying illustrative embodiments in which:

FIG. 1 shows a flow diagram of the system in accordance with this invention; and FIG. 2 is an isometric view showing details of the flotation chambers.

DESCRIPTION OF THE PREFERRED EMBODIMENT

The waste disposal system 10 as depicted in the drawings essentially includes a comminutor 12, a surge tank 14, a flotation system 16, and an incinerator 18. The waste enters the system 10 through the comminutor 12 wherein the waste is "cut" to particle size so as to be more manageable. The liquid medium now containing primarily suspended particulate matter is then fed by gravity to a surge tank 14, upon which the comminutor 12 is preferably mounted.

The medium in the surge tank 14 is fed by way of an airlift pump 24 and a conduit 26 directly to the flotation system 16. The flotation system 16 includes two flotation cells 28 and 30. Flotation cells 28 and 30 are preferably constructed as a unitary structure. A rectangular structure 32 may be conveniently divided along its length by dividing baffle 34, and baffles 36 and 38 proximate its ends form an open six chamber structure. The waste enters the flotation system 16 through a first stagnation chamber 33 from which it is allowed to flow in a laminar fashion into the flotation cell 30 by way of a plurality of small holes or orifices 35 in the baffle 38 on the far side of the dividing baffle 34. The flow then sequentially proceeds from flotation cell 30 through stagnation chamber 40 to flotation cell 28 and then to an output chamber 42.

Chemical conditioning feed tanks 19 and 20, having outlet control valves 21 and 23 may be situated proximate the surge tank 14. Coagulating chemicals are conveyed from the tank 20 by way of control valve 27 to the tank 14 or directly into input line 26 of the flotation system 16, as will be explained. Although many different coagulating chemicals may be used, any standard polymeric flocculating agent is acceptable, such as acrylmide polymers, acrylic acid polymers and vinyl polymers. Alum is preferred because of its low cost and effectiveness. These conditioners have the effect of coagulating waste particles so as to make the number that need to be separated from the liquid medium fewer.

Where the liquid medium is fresh water, it has been found most efficient to convey the conditioning agent directly into the surge tank 14. The conditioning of the particles in the surge tank 14 can be enhanced by bubbling air through the medium so as to tumble and thus produce a region of high contact between the particles, the air and the coagulating chemicals. An air diffuser 22 is shown proximate the bottom of the surge-conditioning tank 14 to perform this function.

However, where the medium is sea water, as for example with shipboard units, addition of chemical conditioners to the tank 14 appears to be inefficient. The coagulated masses produced by conditioners acting upon sea water tend to be held together by relatively weak attractive forces when compared to those developed in masses formed in fresh water. For this reason, the conditioners should be added to sea water in a laminar flow region. Thus, the conditioners can be added directly into the input line 26 through control valve 27. The conditioners should be added so that there is a degree of mixing before flotation, but such that the mixing is over a short time period, e.g., less than about five minutes, so that the coagulated particles do not have time to break up and thus decrease the effectiveness of bubbles in the system.

Further, it has been found that the acidic or basic characteristics of the conditioning agents can have an effect upon the efficiency of flotation. The input stream to the flotation system 16 should have a PH after addition of the flocculating agent, e.g., alum, of 4.5–6.0. In contrast with this desideratum, is the general requirement that the PH of the effluent from the treatment system be approximately neutral, i.e., the effluent should have a PH of from 6.0 to 9.0. An effective way of meeting these requirements is to supply alum from chemical feed tank 20 into input line 26 for delivery to first stagnation chamber 33 so as to produce an influent having a PH of 4.5 and then to feed any inorganic base, such as lime or caustic soda, preferably lime, from chemical feed tank 19 through line 29 to the stagnation chamber 40 positioned in the flow path between the flotation cells 28 and 30. The PH of the effluent can accordingly be raised to about 7.0. These conditioning agents may be either in a powder or a slurry form.

The flotation cells 28 and 30 are of the type wherein the pressure is reduced on a liquid medium supersaturated with air and the reduction of pressure produces minute air bubbles which carry the sewage particulate matter to the surface of the liquid medium. For purposes of producing such minute air bubbles, recycle flow is taken from the bottom of output chamber 42 to a jet pump or air infusion pump 44. Air is mixed with the recycle fluid at the input to the jet pump 44. This aerated fluid is then conveyed to a contacting vessel 46 wherein a supersaturated solution of air and relatively clear water is produced and stored for the flotation cells 28 and 30. The supersaturated fluid is divided between the flotation cells 28 and 30 by means of valves 50 and 52. The valves 50 and 52 also reduce the pressure upon the supersaturated fluid so that minute air bubbles are produced in tanks 28 and 30 through air manifolds 54 and 56 respectively. As is known in the art, the minute air bubbles produced proximate the bottom of the flotation chambers 28 and 30 will act upon the particulate matter therein so as to carry same to the surface of these flotation cells 28 and 30 in the form of a froth. The particular division of the flow between the flotation cells 28 and 30 is based upon the density of particulate matter in each of these flotation chambers. In general, as should be clear, there will be a greater density of particulate matter in cell 30 since this is the first cell in the series of cells to which the fluid is conveyed. For this reason a greater number of minute air bubbles are required therein. By way of example, for a system having an influent flow of 42 gallons per hour the recycle flow will be split with 3 gallons per minute to flotation cell 30 and 2 gallons per minute to flotation cell 28.

The air to be supplied to jet pump 44 is conveniently supplied by plant air blower 58. As can be seen, this air blower may also be utilized to produce the relatively large air bubbles produced by air diffusers 22 in surge conditioning tank 14 and also for the metering pump 24. It is further convenient to use these air bubbles to convey dry powder chemical conditioners from tanks 19 and 20 to the stagnation chamber 40 and to surge tank 14 or conduit 26. Obviously, when slurries are used, a conventional pump would be incorporated in the system.

The liquid medium, water, which contains particulate matter, as was indicated, is first conveyed to flotation cell 30 wherein the minute air bubbles produced by air diffuser 56 cause a substantial portion of the particulate matter therein to be carried to the surface of this flotation cell 30. The liquid is then conveyed via a plurality of small holes proximate the bottom of flotation cell 30 in baffle 36, which holes are designated by the numeral 60, to the far side of a stagnation chamber 40 (see FIG. 2). This medium then slowly diffuses to the near side of stagnation chamber 40 through a plurality of holes in baffle 34, which holes are designated by the numeral 62. From this region the fluid enters flotation cell 28 through holes 64 and a substantial portion of the remaining particulate matter therein is conveyed by way of the air bubbles produced by the mainfold 54 to the surface of this flotation chamber 28. The relatively clear liquid in this flotation chamber then finds egress through holes 66 to the output chamber from which a portion of the clear liquid is conveyed from the system via conduit 68, and as previously explained, a portion is used for recycle via conduit 71 leading to the pump 44. The function of second flotation cell 28 is to enhance the treatment of water to provide an effluent from cell 28 which is the equivalent of tertiary treated water quality, i.e., BOD reduction of 90 or greater.

The frothy foam on the surface of flotation cell 28 may be conveyed via a sludge skimmer 70 to the incinerator 18 where the particulate matter is burned, as is known in the art.

The output of the flotation system 16 may be conveyed via conduit 68 to drain or to a tertiary treatment system such as a carbon filter or other type of filtration means as desired or required for the quality effluent specified. However, it has been found that the output of such flotation chambers which are flow coupled in series with a stagnation chamber therebetween is of extremely high quality and meets most required specifications without further treatment. Moreover, the PH adjustment made, for example by the addition of both alum and lime, yield an effluent that needs no additional treatment for neutralization.

It will be apparent that many modifications or variations may be made to the system in light of the above teachings. It therefore is to be understood that within the scope of the appended claims, the invention may be practiced other than as specifically described.

We claim:

1. A waste treatment system comprising
  a closed conditioning tank adapted for connection to a source of liquid having waste particles therein, said tank having an inlet and an outlet through which said liquid is circulated;
  said conditioning tank having longitudinal and laterally extending baffles therein which divide the tank into stagnation chambers and flotation cells, the arrangement being such that the stagnation chambers are located, on opposite ends of the tank with the flotation cells positioned therebetween;
  openings in said laterally extending baffles designed to operate in the laminar flow region serially connecting the inlet with said outlet by way of a first stagnation chamber, a first flotation cell, second stagnation chamber, second flotation cell and an outlet chamber, said openings being of a size to provide for laminar flow through each of said baffles;
  first feed means connected to said inlet for adding a chemical flocculating agent to said liquid supplied to the closed conditioning tank for coagulating the waste particles therein;
  second feed means connected to said second stagnation chamber for adding an inorganic base to the liquid flowing therethrough in order to raise the PH thereof to about 6.0 to 9.0;

air means connected to the flotation cells in said conditioning tank for imparting minute bubbles of air to the liquid being circulated through the flotation cells to carry the waste particles in said liquid to the surface; and means on said conditioning tank for collecting and disposing of said waste particles while the thus conditioned liquid is discharged through said outlet.

2. The system according to claim 1 wherein a surge tank is connected between said liquid source and said conditioning tank so that said liquid having waste particles therein is first circulated through the surge tank before being discharged into the conditioning tank inlet; and valve means selectively operable to connect the first feed means with said surge tank or with said conditioning tank inlet for adding said chemical flocculating agent to said liquid.

3. The system according to claim 1 wherein said first feed means includes a tank containing the chemical flocculating agent and having a valved outlet connected to said valve means; and said second feed means includes a tank containing the inorganic base material and having a valved outlet connected to said second stagnation chamber.

4. The system according to claim 1 wherein said air means includes a device which supersaturates a liquid with air under pressure; and pressure reducing valves respectively interconnecting said reducing valves with separate manifolds having orifices therein respectively positioned in each of said flotation cells, said valves being effective to reduce the pressure of said supersaturated liquid so that when the supersaturated liquid is reduced in pressure at the outlet of the reducing valves, minute air bubbles are released from the liquid which escape from the manifold orifices and carry said waste particles to the surface of liquid in the flotation cells.

5. The system according to claim 4 wherein the pressure reducing valve connected with the manifold in the first flotation cell is set to provide a greater quantity of minute air bubbles to said first flotation cell than the pressure reducing valve supplies to the second flotation cell.

6. The system according to claim 4 wherein the liquid which is supersaturated by said device is supplied from the conditioning tank outlet chamber; and said reducing valves are set to supply a greater volume of said supersaturated solution to the first flotation cell than to said second flotation cell.

7. A waste water treatment system comprising a comminutor adapted to receive a contaminated influent and having means therein for discharging the comminuted liquid influent to a connected surge conditioning tank, feed means for introducing alum into the surge tank to coagulate suspended particulate matter in the liquid as it flows through the system, means for discharging the thus treated liquid into a closed conditioning tank having a liquid inlet and outlet and flotation cells therein which effect removal of coagulated suspended solids from the liquid, said conditioning tank having longitudinal and laterally extending baffles therein which divide the tank into multiple stagnation chambers and said flotation cells, the stagnation chambers being located in the ends of said conditioning tank with the flotation cells positioned in side by side relationship therebetween, openings in said laterally extending baffles serially connecting the inlet with said outlet by way of a first of said stagnation chambers, a first flotation cell, a second stagnation chamber on the other end of the tank, a second flotation cell and the outlet, thereby providing a path for the liquid which flows slowly through said stagnation chambers and flotation cells prior to discharge at the outlet, a device having air and liquid inlets and means therein for generating an air-liquid supersaturated solution, a conduit connecting the outlet of said device with said cells, and means in said conduit for causing release of minute air bubbles from said supersaturated solution upon delivery thereof to said cells, said air bubbles serving to carry the coagulated particulate matter suspended in the liquid in said cells to the liquid surface; and a mechanical skimmer mounted on said tank above said flotation cells which scrapes the particulate matter from the liquid surface and transfers it to solid disposal apparatus connected thereto.

8. The system according to claim 7 including a second tank, said second tank being connected to said second stagnation chamber, and means for feeding a second conditioning chemical from said second tank to said second stagnation chamber to raise the PH in said liquid therein from about 6.0 to 9.0.

9. The system according to claim 8 where the second conditioning chemical comprises a soluble alkaline solution.

10. The system according to claim 8 wherein said alum is added to achieve a PH of about 4.5 to 6.0 in said liquid and the second conditioning chemical comprises lime which is added to provide a PH in said liquid of about 6.0 to 9.0.

* * * * *